(12) United States Patent
Huang et al.

(10) Patent No.: US 11,110,440 B2
(45) Date of Patent: Sep. 7, 2021

(54) COMPOSITE CATALYST FOR COAL DEPOLYMERIZATION AND USING METHOD THEREFOR

(71) Applicant: TAIYUAN UNIVERSITY OF TECHNOLOGY, Shanxi (CN)

(72) Inventors: Wei Huang, Shanxi (CN); Litong Liang, Shanxi (CN); Qian Zhang, Shanxi (CN); Jianwei Liu, Shanxi (CN); Juntian Huai, Shanxi (CN); Xiaogang Hao, Shanxi (CN); Zhonglin Zhang, Shanxi (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 47 days.

(21) Appl. No.: 16/052,718

(22) Filed: Aug. 2, 2018

(65) Prior Publication Data
US 2019/0009256 A1     Jan. 10, 2019

Related U.S. Application Data

(63) Continuation of application No. PCT/CN2016/073349, filed on Feb. 3, 2016.

(51) Int. Cl.
| | |
|---|---|
| *B01J 27/128* | (2006.01) |
| *B01J 27/25* | (2006.01) |
| *B01J 27/138* | (2006.01) |
| *B01J 23/34* | (2006.01) |
| *B01J 23/26* | (2006.01) |

(Continued)

(52) U.S. Cl.
CPC ............ *B01J 27/128* (2013.01); *B01J 23/26* (2013.01); *B01J 23/34* (2013.01); *B01J 23/881* (2013.01); *B01J 23/8873* (2013.01); *B01J 23/8892* (2013.01); *B01J 27/053* (2013.01); *B01J 27/138* (2013.01); *B01J 27/25* (2013.01);

(Continued)

(58) Field of Classification Search
CPC ...... B01J 27/053; B01J 27/128; B01J 27/138; B01J 23/881; B01J 23/8892; B01J 23/26; B01J 23/34; C10B 57/06; C10B 57/045
See application file for complete search history.

(56) References Cited

U.S. PATENT DOCUMENTS 4,102,775 A * 7/1978 Quarderer ............ C10G 1/083
                                                            208/420
4,331,530 A   5/1982 Qader
(Continued)

FOREIGN PATENT DOCUMENTS

| CN | 102757807 A | 10/2012 |
|---|---|---|
| CN | 102911687 A | 2/2013 |

(Continued)

OTHER PUBLICATIONS

Machine translation of CN103831113A, publication date Jun. 14, 2014.*

(Continued)

*Primary Examiner* — Jun Li

(57) ABSTRACT

A composite catalyst for coal depolymerization, the catalyst includes an agent A and an agent B. The agent A includes an iron salt-based catalyst, and the agent B includes a metal salt-based catalyst different from the iron salt-based catalyst. The agent A and the agent B are alternately added during use.

17 Claims, 2 Drawing Sheets

(51) Int. Cl.
  *C10B 57/04* (2006.01)
  *C10B 57/06* (2006.01)
  *C10B 53/04* (2006.01)
  *C10G 1/08* (2006.01)
  *B01J 23/881* (2006.01)
  *B01J 23/887* (2006.01)
  *B01J 27/053* (2006.01)
  *B01J 23/889* (2006.01)

(52) U.S. Cl.
  CPC ............ *C10B 53/04* (2013.01); *C10B 57/045* (2013.01); *C10B 57/06* (2013.01); *C10G 1/08* (2013.01)

(56) References Cited

U.S. PATENT DOCUMENTS

| | | | | |
|---|---|---|---|---|
| 4,728,418 | A * | 3/1988 | Shabtai | C10G 1/006 208/403 |
| 5,141,908 | A * | 8/1992 | Rao | B01J 29/04 423/326 |
| 2016/0129423 | A1* | 5/2016 | Basset | C07C 2/76 423/651 |

FOREIGN PATENT DOCUMENTS

| | | | |
|---|---|---|---|
| CN | 103831113 A | 6/2014 | |
| CN | 103923680 A | 7/2014 | |
| CN | 104109543 A | 10/2014 | |
| CN | 104479711 A | 4/2015 | |
| CN | 104877700 A | 9/2015 | |
| EP | 0100371 B1 * | 3/1987 | ............... C10G 1/00 |

OTHER PUBLICATIONS

Machine translation of CN 104109543, publication date Oct. 22, 2014.*

* cited by examiner

COMPOSITE CATALYST FOR COAL DEPOLYMERIZATION AND USING METHOD THEREFOR

CROSS-REFERENCE TO RELATED APPLICATIONS

This application is continuation of International Application No. PCT/CN2016/073349, filed on Feb. 3, 2016. The content of the aforementioned applications, including any intervening amendments thereto, are incorporated herein by reference.

TECHNICAL FIELD

The disclosure relates to the technical field of coal catalytic depolymerization, and more particularly, to a composite catalyst for coal catalytic depolymerization and a method of using the composite catalyst.

BACKGROUND

Low-rank coals (LRCs) in China are rich in reserves, accounting for about 55% of total coal reserves. In recent years, the proportion of the LRCs in China's coal utilization has reached 50%. Clean and efficient use of LRCs is currently a major concern of research in the field of LRCs utilization.

Increasing the tar yield during the pyrolysis process is one of the directions of highly efficient utilization of LRCs. Existing techniques for increasing the tar yield include hydropyrolysis, catalytic hydropyrolysis, pretreatment by solvent or ionic liquid, and the like.

In hydropyrolysis, as described is patent application CN104877700A, the reaction apparatus is complicated due to the addition of hydrogen under pressurization.

In addition, in patent application CN102757807A, a ferric ammonium salt is impregnated on the coal for hydropyrolysis, and the tar yield has been greatly improved; in patent application CN10447911A, alcohols and tetrahydrofuran are used as solvents to swell LRCs, and the tar yield of coal pyrolysis is increased by 3.4%; in patent application CN103923680A, acidic ionic liquid 1-butyl sulfonate-3-methylimidazolium triflate is used to treat brown coal and the liquid product yield is increased by 75% compared with the raw coal. However, the processes are too complicated in the above patent applications.

SUMMARY

The present disclosure is to solve at least one of the existing problems, such as low tar yield in catalytic pyrolysis of coal, complicated addition process, high price of catalyst and so on, thereby providing a low-cost and easily industrialized composite catalyst which is capable of improving the tar yield during the catalytic depolymerization of LRCs. According to an aspect of the disclosure, a composite catalyst, containing an agent A and an agent B, is provided for catalytic depolymerization of LRCs, the agent A and the agent B are blended for application. The agent A includes an iron salt-based catalyst, and the agent B includes a metal salt-based catalyst different from the iron salt-based catalyst. It's believed that these catalysts could be added in the coal structure by adding some adjunct reagents, which is different from conventional catalytic pyrolysis where the catalyst is added on the outside surface of coal. Using this method, the basic bridge bonds in the LRCs could be broken selectively with the catalyst assistance, more valuable aromatics could obtained and simultaneously, the pyrolysis temperature could be decreased. This is a novel, catalytic pyrolysis concept, and we named it as coal catalytic depolymerization. It is expected that by this way, the LRCs can be converted into high value-added chemicals or liquid feels in mild conditions so that the energy consumption could be reduced greatly.

In one embodiment, the weight percentage of the iron salt-based catalyst is 3% to 25% in the agent A.

In one embodiment, the iron salt-based catalyst consists of at least one of ferric chloride and ferric nitrate.

In one embodiment, the agent A further consists of at least one of a first inorganic accelerator, a first organic accelerator, a first surfactant, and a first solvent.

In one embodiment the agent A includes the iron salt-based catalyst, the first inorganic accelerator, the first organic accelerator, the first surfactant, and the first solvent, where the weight percentages are 0.5 to 2%, 1 to 10%, and 0.05 to 2.0% in the agent A respectively, and the rest is the first solvent.

In one embodiment, the first inorganic accelerator consists of at least one of potassium permanganate, potassium dichromate, potassium peroxydisulfate, and hydrogen peroxide.

The first organic accelerator consists of at least one of methanol and ethanol.

The first surfactant consists of at least one of fatty alcohol oxyethylene ether, sodium dodecyl benzene sulfonate, alkylphenol polyoxyethylene ether, sodium 1,2-n-butylnaphthalene-6 sulfonate and sodium dioctyl sulfosuccinate.

The first solvent is water.

In one embodiment, the metal salt-based catalyst different from the iron salt-based, catalyst consists of at least one of a zinc salt-based catalyst, a cobalt salt-based catalyst, and an aluminum salt-based catalyst, and the weight percentage of the metal salt-based catalyst is 2% to 15% in the agent B.

In one embodiment, the zinc salt-based catalyst consists of at least one of zinc chloride and zinc nitrate.

The cobalt salt-based catalyst consists of at least one of cobalt chloride and cobalt nitrate.

The aluminum salt-based catalyst consists of at least one of aluminum chloride and aluminum nitrate.

In one embodiment, the agent B further consists of at least one of a second inorganic accelerator, a second organic accelerator, a second surfactant, and a second solvent.

In one embodiment, the agent B includes the metal salt-based catalyst, the second inorganic accelerator, the second organic accelerator, the second surfactant, and the second solvent, where the weight percentages are 0.5 to 2%, 1 to 10%, and 0.05 to 2.0% in the agent B respectively, and the rest is the second solvent.

In one embodiment, the second inorganic accelerator consists of at least one of potassium permanganate, potassium dichromate, potassium peroxydisulfate, and hydrogen peroxide.

The second organic accelerator consists of at least one of methanol and ethanol.

The second surfactant consists of at least one of fatty alcohol, oxyethylene ether, sodium dodecyl benzene sulfonate, alkylphenol polyoxyethylene ether, sodium 1,2-n-butylnaphthalene-6 sulfonate and sodium dioctyl sulfosuccinate.

The second solvent is water.

In one embodiment, the composite catalyst is used for catalytic depolymerization of LRCs for increasing the tar yield.

In one embodiment, LRCs consists of at least one of lignite, long flame coal, non-caking coal, and weakly caking coal.

According to another aspect of the present disclosure, a method of using the composite catalyst described above is provided, including the steps of:

(i) adding the agent A to the LRCs firstly, waiting for a first predetermined time period, and then adding the agent B to the LRCs;

(ii) adding the agent B to the bituminous coal firstly, waiting for the first predetermined time period and adding the agent A to the LRCs; or (iii) repeating the step (i) after waiting for a second predetermined time period on the basis of the step (i) to alternately add the agent A and the agent B for a plurality of times; or repeating the step (ii) after waiting for the second predetermined time period on the basis of the step (ii) to alternately add the agent A and the agent B for a plurality of times.

In one embodiment, the first predetermined time period or the second predetermined time period is greater than or equal to 30 minutes.

In one embodiment, the method further includes the step of:

after waiting for the first predetermined time period, or the second predetermined time period, drying the LRCs with the composite catalyst at 110 to 120° C.

In one embodiment, the method further includes the step of:

heating the LRCs in a fixed bed reactor from 300° to 630 to 650° C. at a rate of 4 to 5° C./min, and keeping the temperature at 630 to 650° C. for 15 to 20 mins to perform depolymerization.

In one embodiment, the agent A or the agent B is added into the LRCs by spraying method.

In one embodiment, adding the agent A or the agent B into the LRCs is accomplished by immersing the LRCs into the agent A or the agent B.

BRIEF DESCRIPTION OF THE DRAWINGS

These and/or other aspects and advantages of the present disclosure will become apparent and readily understood from the following description of preferred embodiments in combination with the drawings.

DETAILED DESCRIPTION

Figure 1:
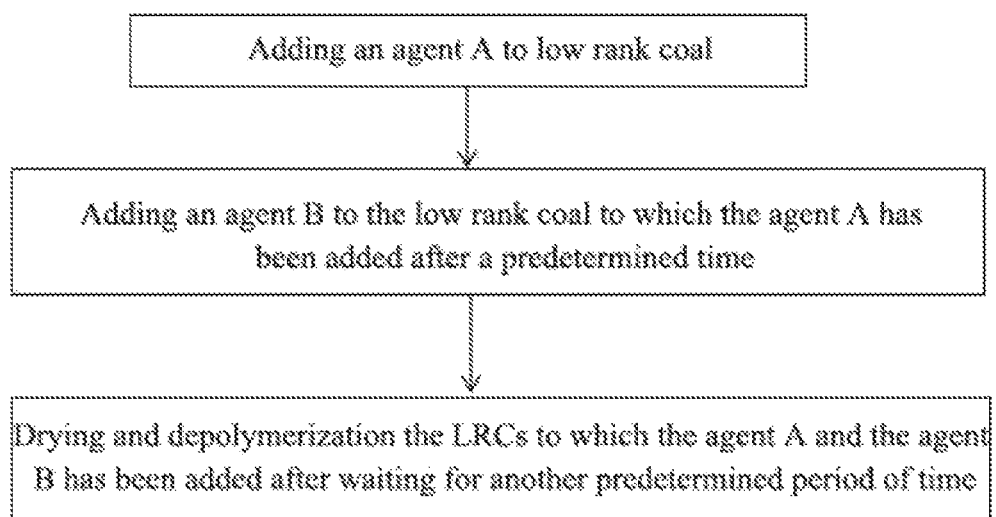
FIG. 1 is a flow chart showing the steps of a method of using the coal depolymerization composite catalyst according to an embodiment of the present disclosure.

The technical solutions of the present disclosure will be further described in detail by way of example and the accompanying drawings. In the description, the same or similar reference numerals indicate the same or similar parts. The description of the embodiments of the present disclosure is intended to be an illustration of the present disclosure, not a limit.

One aspect of the disclosure provides a composite catalyst for depolymerization of LRCs. The composite catalyst is composed of an agent A and an agent B, the agent A and the agent B is alternately added during use, the agent A is an iron salt-based, catalyst, and the agent B is a metal salt-based catalyst different from the iron salt-based, catalyst. The composite catalyst is used for catalytic depolymerization of LRCs for improving the tar yield. Herein, LRCs may consist of at least one of lignite, long flame coal, non-caking coal and weakly caking coal. It can be understood that the use of this composite catalyst for depolymerization of LRCs is only an example or a preferred example of the present disclosure, and those skilled in the art can apply the composite catalyst to other types of coal according to needs or actual conditions, not limited by the specific forms described herein.

The agent A may consist of at least one of the following components as needed, an inorganic accelerator, an organic accelerator, a surfactant, and a solvent, in addition to the iron salt-based catalyst.

In one embodiment, the agent A includes the iron salt-based catalyst, the inorganic accelerator, the organic accelerator, the surfactant, and the solvent, where weight percentages are 3 to 25%, 0.5 to 2%, 1 to 10%, 0.05 to 2.0% in the agent A, respectively, and the rest is the solvent, such as water. Herein, the specific type of solvent can be selected as needed, and water is usually selected, such as tap water, distilled water or deionized water, etc.

In a preferred example, the iron salt-based catalyst consists of at least one of ferric chloride and ferric nitrate. The inorganic accelerator consists of at least one of potassium permanganate, potassium dichromate, potassium peroxydisulfate, and hydrogen peroxide; the organic accelerator consists of at least one of methanol and ethanol; the surfactant consists of at least one of fatty alcohol oxyethylene ether, sodium dodecyl benzene sulfonate, alkylphenol polyoxyethylene ether, sodium 1,2-n-butylnaphthalene-6 sulfonate and sodium dioctyl sulfosuccinate; and the solvent is water. It will be understood that the specific compositions of the iron salt-based catalyst, the inorganic accelerator, the organic accelerator, the surfactant and the solvent described herein are merely exemplary, and those skilled in the art can select other suitable constituent components as needed, for example, the iron salt-based catalyst may be any other iron-based catalyst different from ferric chloride or ferric nitrate, and ferric chloride and ferric nitrate are shown here only as specific examples. For the above-mentioned inorganic accelerator, organic accelerator, surfactant, and solvent, those skilled in the art can select other constituent components different from the specific examples shown above as needed, and this will not be described in detail herein.

In the agent B, a suitable type or kind of metal salt-based catalyst different from the iron salt-based catalyst may be selected depending on the specific characteristics of the coal. Generally, the metal salt-based catalyst is selected to consist of at least one of a zinc salt-based catalyst, a cobalt salt-based catalyst, and an aluminum salt-based catalyst. Of course, the metal salt-based catalyst may be a suitable metal salt-based catalyst other than, the iron, zinc, cobalt, aluminum, salt-based catalysts or a catalyst other than the metal salt-based catalysts described above.

The agent B may consist of at least one of the following compositions as needed, in addition to the metal salt-based catalyst different from the iron salt-based catalyst: an inorganic accelerator, an organic accelerator, a surfactant, and a solvent.

In one embodiment, the agent B includes the metal salt-based catalyst different from the iron salt-based catalyst, the inorganic accelerator, the organic accelerator, the surfactant, and the solvent, where weight percentages 3 to 15%, 0.5 to 2%, 1 to 10%, 0.05 to 2.0% in the agent B respectively, and the rest is the solvent (such as water). Herein, the specific type of solvent, can be selected as needed, and water is usually selected (for example, tap water, distilled water or deionized water, etc.).

In a preferred example, the zinc salt-based catalyst consists of at least one of zinc chloride and zinc nitrate; the cobalt salt-based catalyst consists of at least one of cobalt chloride and cobalt nitrate; the aluminum salt-based catalyst consists of at least one aluminum chloride and aluminum nitrate. The inorganic accelerator consists of at least one of potassium permanganate, potassium dichromate, potassium peroxydisulfate, and hydrogen peroxide; the organic accelerator consists of at least one of methanol and ethanol; the surfactant consists of at least one of fatty alcohol oxyethylene ether, sodium dodecyl benzene sulfonate, alkylphenol polyoxyethylene ether, sodium 1,2-n-butylnaphthalene-6 sulfonate and sodium dioctyl sulfosuccinate; and the solvent is water. It will be understood that the specific compositions of the iron salt-based, catalyst, the inorganic accelerator, the organic accelerator, the surfactant and the solvent described herein are merely exemplary, and those skilled in the art can select other constituent components as needed, for example, the iron salt-based catalyst may be any other iron-based catalyst different from ferric chloride or ferric nitrate, and ferric chloride and ferric nitrate are shown here only as specific examples. For the above-mentioned cobalt salt-based catalyst, aluminum salt-based catalyst inorganic accelerator, organic accelerator, surfactant, and solvent, those skilled in the art can select other constituent components different from the specific examples shown above as needed, and this will not be described in detail herein.

It should be noted here that the inorganic accelerator, the organic accelerator and the surfactant in the agent A and the agent B may be selected to be the same or different when used for the same coal type. That is, for example, potassium permanganate may be selected as the inorganic accelerator in the agent A, and potassium permanganate may also be selected as the inorganic accelerator in the agent B; of course, potassium dichromate may also be selected. The corresponding selection can also be made in a similar manner for other components, and therefore will not be described, in detail herein.

According to another aspect of the present disclosure, a method, of using the above-described composite catalyst is also provided.

Figure 2:
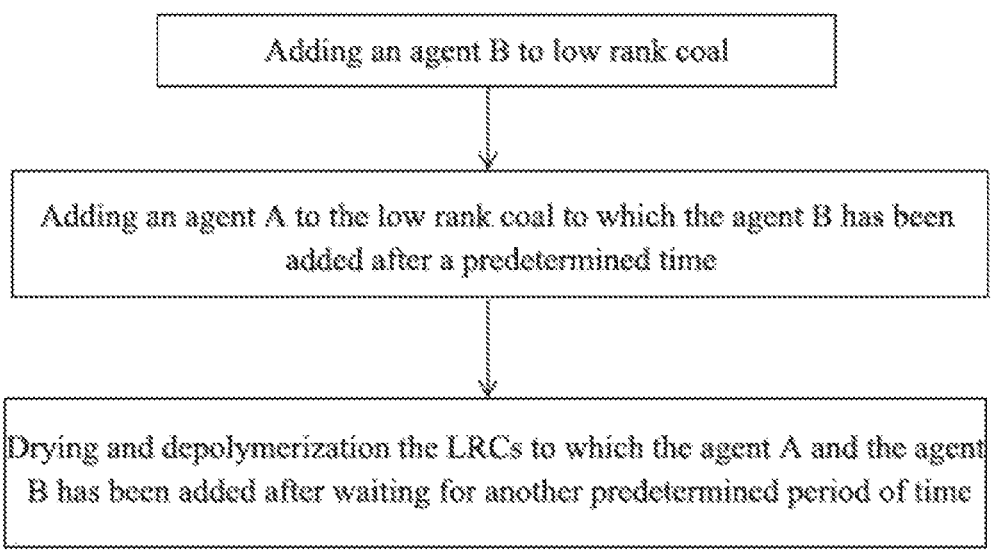
FIG. 2 is a flow chart showing the steps of another method of using the coal depolymerization composite catalyst according to an embodiment of the present disclosure.

Referring to FIGS. 1-2, the method specifically includes the following steps:

(i) adding the agent A to LRCs firstly, and then adding the agent B to LRCs after waiting for a first predetermined time period;

(ii) adding the agent B to LRCs firstly, and then adding the agent A to LRCs after waiting for the first predetermined time period; or (iii) repeating the step (i) after waiting for a second predetermined time period on the basis of the step (i) to alternately add the agent A and the agent B for a plurality of times; or repeating the step (ii) after waiting for the second predetermined, time period on the basis of the step (ii) to alternately add the agent A and the agent B for a plurality of times.

That is to say those skilled in the art can select the type of the agent A and the agent B and the order of addition thereof according to actual needs. For example, the order of addition may be selectively as A-B-A, or A-B-A-B, or B-A-B, or B-A-B-A, where each of the components m the agent B in two consecutive additions may be selected to be same or different, for example, in the first addition of the agent B in the order above-mentioned, the agent B may include a cobalt salt-based catalyst, and in the second addition of the agent B, the agent B may include an aluminum salt-based catalyst, and other components in the agent B may also be selected in a similar way and will not be described in detail herein.

Usually, the interval between the addition of the agent A and the agent B or a predetermined time period between them is 30 minutes or more, and of course, any time period of less than 30 minutes may be selected, for example, 15 minutes or the like.

In the above method, the drying step is specifically as follows: after adding the last kind of the agent A or the agent B, waiting for the first predetermined time period, or the second predetermined time period or after a certain predetermined time period, drying LRCs with the depolymerization composite catalyst at 110 to 120° C.

In addition, the above method further includes a depolymerization step: specifically, heating the dried LRCs in a fixed bed reactor from 300° C. to 630 to 650° C. at a rate of 4 to 5° C./min, and keeping the temperature at 630 to 650° C. for 15 to 20 mins to perform, depolymerization. Of course, the depolymerizing step described above is only an example, and those skilled in the art may select the specific steps and specific parameters described above as needed, which are not limited to the above scenario.

The method of adding the composite catalyst in the present disclosure may be selected to be adding the agent A or the agent B to the coal by spraying or by immersing LRCs with or into the agent A or the agent B. Of course, those skilled in the art can select the addition method according to actual situations, which is not limited to the specific addition manner described above.

Some examples of the above-described composite catalyst in the present disclosure are given below in comparison with the agent A or the agent B without using a catalyst and with using a catalyst. It should be noted that the following examples are only a small part of the numerous examples of the present disclosure, and they are taken as examples to enable those skilled in the art to better understand the inventive concept of the present disclosure, and should not be regarded as a limitation of the disclosure. Those skilled in the art can obtain more complete or all examples according to the above disclosure of the present disclosure, which will not be described in detail herein.

EXAMPLE 1

Potassium permanganate 1.0%, ferric chloride 10%, methanol 5%, and fatty alcohol polyoxyethylene ether 2.0% in a weight percentage are mixed and dissolved in water to obtain the agent A; potassium permanganate 1.0%, zinc chloride 5%, methanol 5%, and fatty alcohol polyoxyethylene ether 2.0% in a weight percentage are mixed and dissolved in water to obtain the agent B. The agent A is sprayed into lignite (the coal in this example is Inner Mongolia Xinghe coal) in an amount of 60 L/ton dry base coal, after 30 minutes, the agent B is sprayed to the lignite in an amount of 30 L/ton dry base coal, and after 30 minutes, the coal with the above-described composite catalyst (i.e., the agent A and the agent B) in the present disclosure is dried at 110° C. The dried coal sample is healed in a fixed bed reactor from 300° C. to 650° C. at a rate of 5° C./min, and the temperature is kept at 650° C. for 15 minutes to perform depolymerization. The distribution of the depolymerized product finally obtained is shown in Table 1 (the comparative example is the depolymerization result of the lignite without adding the catalyst and with only adding the agent A or the agent B under the same treatment step).

It can be understood that, in order to facilitate comparative analysis, comparative examples 1-1, 1-2, and 1-3 are carried out in the same steps and operating conditions as in Example 1, for example, when comparative example 1-2 is carried, out, the addition of the agent A is earned out under the operating conditions identical to Example 1, followed by the same drying and depolymerization steps, the only difference is that the agent B is not added. Comparative analysis of the respective examples and comparative examples is also earned, out in the same manner as in Example 2-6 described below, and thus will not be described in detail herein.

TABLE 1

| Serial number | | Yield % | | | |
| --- | --- | --- | --- | --- | --- |
| | | Tar | Water | Gas | Char |
| Comparative example 1-1 | Catalyst not added | 5.26 | 8.62 | 19.80 | 66.32 |
| Comparative example 1-2 | Agent A added only | 7.67 | 8.26 | 18.45 | 65.62 |
| Comparative example 1-3 | Agent B added only | 6.65 | 5.31 | 20.22 | 67.82 |
| Example 1 | Agents A and B alternately added | 8.70 | 6.83 | 18.80 | 65.67 |

From the results in Table 1, it is shown that the tar yield after coal pyrolysis with the composite catalyst increased by 65.4%, 13.4%, 30.8%, respectively, in comparison with that without the catalyst, or with only adding the agent. A or the agent B.

EXAMPLE 2

Potassium permanganate 1.0%, iron nitrate 10%, methanol 5%, and fatty alcohol polyoxyethylene ether 2.0% in a weight percentage are mixed and dissolved in water to obtain the agent A; potassium permanganate 1.0%. aluminum nitrate 10%, methanol 5%, and fatty alcohol polyoxyethylene ether 2.0% in a weight percentage are mixed and dissolved in water to obtain the agent B. The agent A is sprayed into lignite (the coal in this example is Inner Mongolia Xinghe coal) in an amount of 60 L/ton dry base coal, after 30 minutes, the agent B is sprayed to the lignite in an amount of 30 L/ton dry base coal, and after 30 minutes, the coal added with the above-described composite catalyst in the present disclosure is dried at 110° C. The dried coal sample is heated in a fixed bed reactor from 300° C. to 650° C. at a rate of 5° C./min, and the temperature is kept at 650° C. for 15 minutes to perform depolymerization. The distribution of the depolymerized product finally obtained is shown in Table 2 (the comparative example is the depolymerization result of the lignite without adding the catalyst and with only adding the agent A or the agent B under the same treatment step).

TABLE 2

| Serial number | | Yield % | | | |
| --- | --- | --- | --- | --- | --- |
| | | Tar | Water | Gas | Char |
| Comparative example 2-1 | Catalyst not added | 5.26 | 8.62 | 19.80 | 66.32 |
| Comparative example 2-2 | Agent A added only | 7.67 | 8.26 | 18.45 | 65.62 |
| Comparative example 2-3 | Agent B added only | 6.30 | 11.79 | 17.89 | 64.02 |
| Example 2 | Agents A and B alternately added | 8.95 | 8.32 | 18.24 | 64.49 |

From the results in Table 2, it is shown that the tar yield alter the coal pyrolysis with the composite catalyst added is increased by 70.2%, 16.7%, 42.1%, respectively, in comparison with that without the catalyst, or with only the agent A or the agent B.

EXAMPLE 3

Potassium dichromate 1.0%, ferric chloride 6%, ethanol 5%, and sodium dodecyl benzene sulfonate 1.2% in a weight percentage are mixed and dissolved in water to obtain the agent A; potassium dichromate 1.0%, ferric chloride 4%, ethanol 5%, and sodium, dodecyl benzene sulfonate 1.2% in a weight percentage are mixed and dissolved in water to obtain the agent B. The agent. A is sprayed into lignite (the coal is Yunnan Pioneer Coal) in an amount of 60 L/ton dry base coal, after 45 minutes, the agent B is sprayed to the lignite in an amount of 30 L/ton dry base coal, and after 45 minutes, the coal, added with the above-described composite catalyst in the present disclosure is dried at 110° C. The dried coal sample is heated in a fixed bed reactor from 300° C. to 630° C. at a rate of 4° C./min, and the temperature is kept at 630° C. for 15 minutes to perform depolymerization. The distribution of the depolymerized product finally obtained is shown in Table 3 (the comparative example is the depolymerization result of the lignite without adding the catalyst and with only adding the agent A or the agent B under the same treatment step).

TABLE 3

| Serial number | | Yield % | | | |
| --- | --- | --- | --- | --- | --- |
| | | Tar | Water | Gas | char |
| Comparative example 3-1 | Catalyst not added | 10.86 | 6.27 | 23.79 | 59.08 |
| Comparative example 3-2 | Agent A added only | 12.39 | 4.27 | 25.78 | 57.56 |
| Comparative example 3-3 | Agent B added only | 11.85 | 2.84 | 24.34 | 60.97 |
| Example 3 | Agents A and B alternately added | 13.65 | 3.61 | 24.10 | 58.64 |

From the results in Table 3, it is shown that the tar yield alter the coal pyrolysis with the composite catalyst added is increased by 25.7%, 10.2%, 15.2%, respectively, in comparison with that without the catalyst, or with, only the agent A or the agent B.

EXAMPLE 4

Potassium dichromate 1.0%, iron nitrate 6%, ethanol 5%, and sodium dodecyl benzene sulfonate 1.2% in a weight percentage are mixed and dissolved in water to obtain the agent A; potassium dichromate 1.0%, zinc nitrate 12%, ethanol 5%, and sodium dodecyl benzene sulfonate 1.2% in a weight percentage are mixed and dissolved in water to obtain the agent B. The agent A is sprayed into lignite (the coal is Yunnan Xiaufeng Coal) in an amount of 60 L/ton dry base coal, after 45 minutes, the agent B is sprayed to the lignite in an amount of 30 L/ton dry base coal, and after 45 minutes, the coal added with the above-described composite catalyst hi the present disclosure is dried at 110° C. The dried coal sample is heated in a fixed, bed reactor from 300° C. to 630° C. at a rate of 4° C./mm, and the temperature is kept at 630° C. for 15 minutes to perform depolymerization. The distribution of the depolymerized product finally obtained is shown in Table 4 (the comparative example is the depolymerization result of the lignite without adding the catalyst and with only adding the agent A or the agent B under the same treatment step).

TABLE 4

|  |  | Yield % | | | |
| --- | --- | --- | --- | --- | --- |
| Serial number | | Tar | Water | Gas | Char |
| Comparative example 4-1 | Catalyst not added | 10.86 | 6.27 | 23.79 | 59.08 |
| Comparative example 4-2 | Agent A added only | 12.39 | 4.27 | 25.78 | 57.56 |
| Comparative example 4-3 | Agent B added only | 11.58 | 6.94 | 24.34 | 57.79 |
| Example 4 | Agents A and B alternately added | 14.03 | 3.61 | 24.72 | 57.64 |

From the results in Table 4, it is shown that the tar yield after the coal pyrolysis with the composite catalyst added is increased by 29.2%, 13.2%, 21.2%, respectively, in comparison with that without the catalyst, or with only the agent A or the agent B.

EXAMPLE 5

Potassium peroxodisulfate 1.2%, ferric chloride 8%, ethanol 5%, and sodium dioctyl sulfosuccinate 1.0% in a weight percentage are mixed and dissolved in water to obtain the agent A; potassium peroxodisulfate 1.2%, aluminum chloride 10%, ethanol 5%, and sodium dioctyl sulfosuccinate 1.0% in a weight percentage are mixed and dissolved in water to obtain the agent B. The agent A is sprayed into long flame coal (the coal is Shaanxi coal) in an amount of 50 L/ton dry base coal, after 50 minutes, the agent B is sprayed to the long flame coal in an amount of 25 L/ton dry base coal, and after 40 minutes, the long flame coal added with the above-described composite catalyst in the present disclosure is dried at 110° C. The dried, coal sample is heated in a fixed bed reactor from 300° C. to 650° C. at a rate of 4° C./min, and the temperature is kept at 650° C. for 20 minutes to perform depolymerization. The distribution of the depolymerized product finally obtained is shown in Table 5 (the comparative example is the depolymerization result of the long flame coal without adding the catalyst and with only adding the agent A or the agent B under the same treatment step).

TABLE 5

|  |  | Yield % | | | |
| --- | --- | --- | --- | --- | --- |
| Serial number | | Tar | Pyrolytic Water | Gas | Char |
| Comparative example 5-1 | Catalyst not added | 8.92 | 3.61 | 6.94 | 80.53 |
| Comparative example 5-2 | Agent A added only | 9.96 | 2.73 | 6.84 | 80.47 |
| Comparative example 5-3 | Agent B added only | 9.78 | 3.24 | 7.01 | 79.97 |
| Example 5 | Agents A and B alternately added | 11.65 | 2.91 | 6.50 | 78.94 |

From the results in Table 5, it is shown that the tar yield after the coal pyrolysis with the composite catalyst added is increased by 29.2%, 13.2%, 21.2%, respectively, in comparison with that without the catalyst, or with only the agent A or the agent B.

EXAMPLE 6

Potassium peroxodisulfate 1.2%, ferric nitrate 8%, ethanol 5%, and sodium dioctyl sulfosuccinate 1.0% in a weight percentage are mixed and dissolved in water to obtain the agent A; potassium peroxodisulfate 1.2%, aluminum nitrate 10%, ethanol 5%, and sodium dioctyl sulfosuccinate 1.0% in a weight percentage are mixed and dissolved in water to obtain the agent B. The agent A is sprayed into long flame coal (the coal is Shaanxi coal) in an amount of 50 L/ton dry base coal, after 50 minutes, the agent B is sprayed to the long flame coal in an amount of 25 L/ton dry base coal, and after 40 minutes, the long flame coal added with the above-described composite catalyst in the present disclosure is dried at 120° C. The dried coal sample is heated in a fixed bed reactor from 300° C. to 650 at a rate of 5° C./min, and the temperature is kept at 650° C. for 20 minutes to perform depolymerization. The distribution of the depolymerized product finally obtained is shown in Table 6 (the comparative example is the depolymerization result of the long flame coal, without adding the catalyst and with only adding the agent A or the agent B under the same treatment step).

TABLE 6

|  |  | Yield % | | | |
| --- | --- | --- | --- | --- | --- |
| Serial number | | Tar | Water | Gas | Char |
| Comparative example 6-1 | Catalyst not added | 8.92 | 3.61 | 6.94 | 80.53 |
| Comparative example 6-2 | Agent A added only | 9.96 | 2.73 | 6.84 | 80.47 |
| Comparative example 6-3 | Agent B added only | 10.23 | 3.53 | 7.20 | 79.04 |
| Example 6 | Agents A and B alternately added | 12.57 | 3.16 | 6.25 | 78.02 |

From the results in Table 6, it is shown that the tar yield. after coal pyrolysis with the composite catalyst added is increased by 40.9%, 26.2%. 22,9%, respectively, in comparison with that without the catalyst, or with only the agent A or the agent B.

It should, be noted that the agent A and the agent B are added only once in the above Examples 1-6, but it is understood that if the agent A and the agent B are added multiple times, the effect of improving the tar yield of the coal is better. Usually considering the cost of benefit, the agent A and the agent B are generally added only once.

The above examples are only exemplified by lignite and long-flame coal. Of coarse, the composite catalyst of the present disclosure can also be used for other LRCs such as non-caking coal and weakly caking coal, and other suitable types of coal, examples of which are not shown here.

It should be noted that the above-mentioned composite catalyst is a catalytic depolymerization of LRCs and tar-increasing composite catalyst mainly composed of an iron salt-based catalyst. Different active ingredients and addition amount of the agent B can be selected for the catalytic depolymerization of LRCs and tar-increasing composite catalyst according to the characteristics of the coal itself, to further improve the tar yield on the basis of the depolymerization and tar addition of the iron salt-based catalyst, and the composite catalyst used, for depolymerization of LRCs has characteristics of high production, high storage and transportation safety and simple use method. In the process of LRCs pyrolysis, the composite catalyst is thermally decomposed to produce a catalytically active component, which acts on different functional groups in the coal, promotes the fracture of more chemical bonds which facilitates tar forming in the coal, and improves the tar yield.

An active ingredient of the composite catalyst in the present disclosure is less than 1% by weight of the raw coal, and 90% of the components are decomposed or evaporated in the depolymerization process. After decomposition, the weight percentage of the component finally remaining in the char is less than 0.5%, so there is almost no influence on the quality of the char.

Another feature of the composite catalyst in the present disclosure is that due to the small amount of tar-increasing agent and the volatilization and decomposition in the depolymerization process, the amount lastly remaining in the char is small, so there is almost no influence on the quality of the char after depolymerization.

The addition process of the composite catalyst in the disclosure is simple in operation, and the raw coal after the addition of the catalyst, for example, after 30 minutes, can be put into production and it is easy to realize continuous industrial production.

Since the disclosure is used before depolymerization of LRCs, it does not need to modify the depolymerization process, and can be widely applied to fluidized bed, moving bed, fixed bed, external heat type and internal heat type depolymerization furnace.

The above are only some embodiments of the present disclosure, and those skilled in the art will understand that the embodiments may be modified without departing from the principle and spirit of the present general inventive concept, and the scope of the present disclosure is defined by claims and their equivalents.

What is claimed is:

1. A composite catalyst for coal depolymerization, comprising an agent A and an agent B; wherein the agent A comprises an iron salt-containing catalyst; and the agent B comprises a metal salt-containing catalyst different from the iron salt-containing catalyst;
   the metal salt-containing catalyst different from the iron salt-containing catalyst is an aluminum salt-containing catalyst; and
   the aluminum salt-containing catalyst is aluminum nitrate.

2. The composite catalyst of claim 1, wherein a weight percentage of the iron salt-containing catalyst is 3% to 25% in the agent A.

3. The composite catalyst of claim 2, wherein the iron salt-containing catalyst consists of at least one of ferric chloride and ferric nitrate.

4. The composite catalyst of claim 3, wherein the agent A further consists of at least one of a first inorganic accelerator, a first organic accelerator, a first surfactant and a first solvent.

5. The composite catalyst of claim 4, wherein the agent A comprises the iron salt-containing catalyst, the first inorganic accelerator, the first organic accelerator, the first surfactant, and the first solvent;
   weight percentages of the first inorganic accelerator, the first organic accelerator and the first surfactant are 0.5 to 2%, 1 to 10%, and 0.05 to 2.0% in the agent A, respectively; and a balance is the first solvent.

6. The composite catalyst of claim 5, wherein the first inorganic accelerator consists of at least one of potassium permanganate, potassium dichromate, potassium peroxydisulfate, and hydrogen peroxide; the first organic accelerator consists of at least one of methanol and ethanol; the first surfactant consists of at least one of fatty alcohol oxyethylene ether, sodium dodecyl benzene sulfonate, alkylphenol polyoxyethylene ether, sodium 1,2-n-butylnaphthalene-6 sulfonate and sodium dioctyl sulfosuccinate; and the first solvent is water.

7. The composite catalyst of claim 1, wherein
   a weight percentage of the metal salt-containing catalyst is 2% to 15% in the agent B.

8. The composite catalyst of claim 7, wherein the agent B further consists of at least one of a second inorganic accelerator, a second organic accelerator, a second surfactant, and a second solvent.

9. The composite catalyst of claim 8, wherein the agent B comprises the metal salt-containing catalyst, the second inorganic accelerator, the second organic accelerator, the second surfactant, and the second solvent;
   weight percentages of the second inorganic accelerator, the second organic accelerator, and the second surfactant are 0.5 to 2%, 1 to 10%, and 0.05 to 2.0% in the agent B, respectively; and
   a balance is the second solvent.

10. The composite catalyst of claim 9, wherein the second inorganic accelerator consists of at least one of potassium permanganate, potassium dichromate, potassium peroxydisulfate and hydrogen peroxide;
    the second organic accelerator consists of at least one of methanol and ethanol;
    the second surfactant consists of at least one of fatty alcohol oxyethylene ether, sodium dodecyl benzene sulfonate, alkylphenol polyoxyethylene ether, sodium 1,2-n-butylnaphthalene-6 sulfonate and sodium dioctyl sulfosuccinate; and
    the second solvent is water.

11. The composite catalyst of claim 1, wherein a bituminous coal consists of at least one of lignite, long flame coal, non-stick coal, and weakly caking coal.

12. A method of using the composite catalyst for coal pyrolysis of claim 1, comprising the steps of:
    (i) adding the agent A to the bituminous coal, and adding the agent B to the bituminous coal after waiting for a first predetermined time period; or
    (ii) adding the agent B to the bituminous coal, and adding the agent A to the bituminous coal after waiting for the first predetermined time period; or
    (iii) repeating the step (i) after waiting for a second predetermined time period on the basis of the step (i) by alternately adding the agent A and the agent B for a plurality of times; or repeating the step (ii) after waiting for the second predetermined time period on the basis of the step (ii) by alternately adding the agent A and the agent B for a plurality of times.

13. The method of claim 12, wherein the first predetermined time period or the second predetermined time period is greater than or equal to 30 minutes.

14. The method of claim 12, wherein the method further comprises the step of: drying the low rank coal with the depolymerization composite catalyst at 110 to 120° C. after waiting for the first predetermined time period or the second predetermined time period.

15. The method of claim 14, wherein the method further comprises the step of: heating the dried low rank coal in a fixed bed reactor from 300° C. to 630 to 650° C. at a rate of 4 to 5° C./min, and keeping a temperature at 630 to 650° C. for 15 to 20 mins to perform depolymerization.

16. The method of claim 14, wherein the agent A or the agent B is added into the low rank coal by spraying.

17. The method of claim 14, wherein adding the agent A or the agent B into the low rank coal is accomplished by immersing the bituminous coal into the agent A or the agent B.

* * * * *